United States Patent
Fan et al.

(10) Patent No.: US 12,375,770 B2
(45) Date of Patent: Jul. 29, 2025

(54) INTERACTION METHOD AND APPARATUS, ELECTRONIC DEVICE, AND STORAGE MEDIUM

(71) Applicant: Beijing Youzhuju Network Technology Co., Ltd., Beijing (CN)

(72) Inventors: Kequan Fan, Beijing (CN); Yan Zhang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/679,244

(22) Filed: May 30, 2024

(65) Prior Publication Data

US 2024/0406508 A1    Dec. 5, 2024

(30) Foreign Application Priority Data

May 30, 2023   (CN) .......................... 202310632240.2

(51) Int. Cl.
*H04N 21/4725* (2011.01)
*G06F 16/738* (2019.01)
(Continued)

(52) U.S. Cl.
CPC ....... *H04N 21/4725* (2013.01); *G06F 16/738* (2019.01); *G06F 16/7837* (2019.01); *H04N 21/4316* (2013.01)

(58) Field of Classification Search
CPC ............ H04N 21/4725; H04N 21/4316; G06F 16/738; G06F 16/7837
See application file for complete search history.

(56) References Cited

U.S. PATENT DOCUMENTS

| 10,440,435 B1* | 10/2019 | Erdmann ........... H04N 21/4122 |
| 2010/0082585 A1* | 4/2010 | Barsook .............. G06F 16/9535 707/706 |

(Continued)

FOREIGN PATENT DOCUMENTS

| CN | 111127053 A | 5/2020 |
| CN | 113157970 A | 7/2021 |

(Continued)

OTHER PUBLICATIONS

International Search Report for PCT/CN2024/096390, mailed on Aug. 14, 2024, 3 pages.

*Primary Examiner* — William L Bashore
*Assistant Examiner* — Gregory A Distefano
(74) *Attorney, Agent, or Firm* — Astute IP Law Group

(57) ABSTRACT

The disclosure relates to an interaction method and apparatus, an electronic device, and a storage medium. The method includes: displaying a video playback page, where the video playback page is used for playing a target video, and the target video is associated with a target object; displaying a target object search result display page and/or a guidance page if first operation information on the video playback page by a user satisfies a preset trigger condition and a target object search instruction is collected, where the guidance page includes search prompt information, and the search prompt information is used for showing an entry into the target object search result display page; and the target object search result display page is used for displaying search results related to the target object.

18 Claims, 12 Drawing Sheets

(51) Int. Cl.
*G06F 16/783* (2019.01)
*H04N 21/431* (2011.01)

(56) References Cited

U.S. PATENT DOCUMENTS

| | | | |
|---|---|---|---|
| 2011/0179021 A1* | 7/2011 | Wen | G06F 16/58 |
| | | | 707/723 |
| 2011/0181779 A1* | 7/2011 | Park | H04N 21/4725 |
| | | | 348/563 |
| 2011/0196864 A1* | 8/2011 | Mason | G06F 3/0488 |
| | | | 707/E17.014 |
| 2012/0167145 A1* | 6/2012 | Incorvia | H04N 21/47815 |
| | | | 725/60 |
| 2015/0134688 A1* | 5/2015 | Jing | G09G 5/14 |
| | | | 707/766 |
| 2015/0181302 A1* | 6/2015 | Yueh | H04N 21/234318 |
| | | | 725/34 |
| 2016/0078056 A1* | 3/2016 | Huang | G06Q 30/0623 |
| | | | 348/169 |
| 2018/0046631 A1* | 2/2018 | Choi | G06V 20/40 |
| 2019/0095467 A1* | 3/2019 | Kislyuk | G06F 16/5838 |
| 2019/0294631 A1* | 9/2019 | Alcantara | G06V 20/41 |
| 2019/0325224 A1* | 10/2019 | Lee | G06V 10/235 |
| 2021/0191971 A1* | 6/2021 | Ko | G06F 16/535 |

FOREIGN PATENT DOCUMENTS

| | | |
|---|---|---|
| CN | 113486253 A | 10/2021 |
| CN | 113781161 A | 12/2021 |
| CN | 114745561 A | 7/2022 |

\* cited by examiner

INTERACTION METHOD AND APPARATUS, ELECTRONIC DEVICE, AND STORAGE MEDIUM

CROSS-REFERENCE TO RELATED APPLICATION(S)

This application claims priority to Chinese Application No. 202310632240.2 filed May 30, 2023, the disclosure of which is incorporated herein by reference in its entity.

FIELD

The disclosure relates to the technical field of human-computer interaction, and in particular to an interaction method and apparatus, an electronic device, and a storage medium.

BACKGROUND

With the continuous development of related technologies in e-commerce applications (APPs), people have more diverse demands for related functions of the e-commerce applications, especially in terms of information display methods, display content, etc. closely related to use experience of people.

Therefore, how to meet diverse interactive function requirements of users for the e-commerce applications so as to enhance the use experience of the users is a technical problem that urgently needs to be solved.

SUMMARY

In order to solve the above technical problems or at least partially solve the above technical problems, the disclosure provides an interaction method and apparatus, an electronic device, and a storage medium.

In a first aspect, the disclosure provides an interaction method, including:
  displaying a video playback page, where the video playback page is used for playing a target video, and the target video is associated with a target object; and
  in response to first operation information on the video playback page by a user satisfying a preset trigger condition, and a target object search instruction being collected, displaying a target object search result display page and/or a guidance page,
  where the guidance page includes search prompt information, and the search prompt information is used for showing an entry into the target object search result display page; and the target object search result display page is used for displaying search results related to the target object.

In a second aspect, the disclosure further provides an interaction apparatus, including:
  a video playback page display module, configured to display a video playback page, where the video playback page is used for playing a target video, and the target video is associated with a target object; and
  a search related page display module, configured to, in response to first operation information on the video playback page by a user satisfying a preset trigger condition, and a target object search instruction being collected, display a target object search result display page and/or a guidance page,
  where the guidance page includes search prompt information, and the search prompt information is used for showing an entry into the target object search result display page; and the target object search result display page is used for displaying search results related to the target object.

In a third aspect, the disclosure further provides an electronic device. The electronic device includes:
  one or more processors; and
  a storage device configured to store one or more programs;
  when the one or more programs are executed by the one or more processors, the one or more processors implement the above interaction method.

In a fourth aspect, the disclosure further provides a computer-readable storage medium, storing a computer program. The program, when executed by a processor, implements the above interaction method.

Compared with the prior art, the technical solutions provided by the embodiments of the disclosure have the following advantages:

in the technical solutions provided by the embodiments of the disclosure, the video playback page is displayed, and is used for playing the target video, and the target video is associated with the target object; in response to first operation information on the video playback page by a user satisfying a preset trigger condition, and a target object search instruction being collected, the target object search result display page and/or the guidance page are/is displayed, where the guidance page includes the search prompt information, and the search prompt information is used for showing the entry into the target object search result display page; and the target object search result display page is used for displaying the search results related to the target object, which is essentially to provide a method for assisting the user in quickly finding search results related to the target object according to needs of the user. In the process of performing the whole method, there are few steps requiring user operation, thereby achieving the purpose of improving search efficiency of the user and enhancing user experience.

BRIEF DESCRIPTION OF THE DRAWINGS

The accompanying drawings herein are incorporated into the specification to form a part of the specification, illustrate embodiments conforming to the disclosure, and are used to explain the principle of the disclosure together with the specification.

In order to describe the technical solutions in the embodiments of the disclosure or in the prior art more clearly, the accompanying drawings required to be used in descriptions of the embodiments or the prior art will be briefly introduced below, and it is apparent that those of ordinary skill in the art can obtain other accompanying drawings according to these accompanying drawings without creative work.

DETAILED DESCRIPTION OF EMBODIMENTS

To have a clearer understanding of the above objectives, features, and advantages of the disclosure, the solution of the disclosure is further described below. It should be noted that features of the embodiments and implementations in the disclosure can be mutually combined without conflicts.

Many specific details are elaborated in the following description to facilitate a full understanding of the disclosure, but the disclosure may also be implemented in methods different from those described here. Obviously, the embodiments in the specification are only a part rather all of the embodiments of the disclosure.

Figure 1:
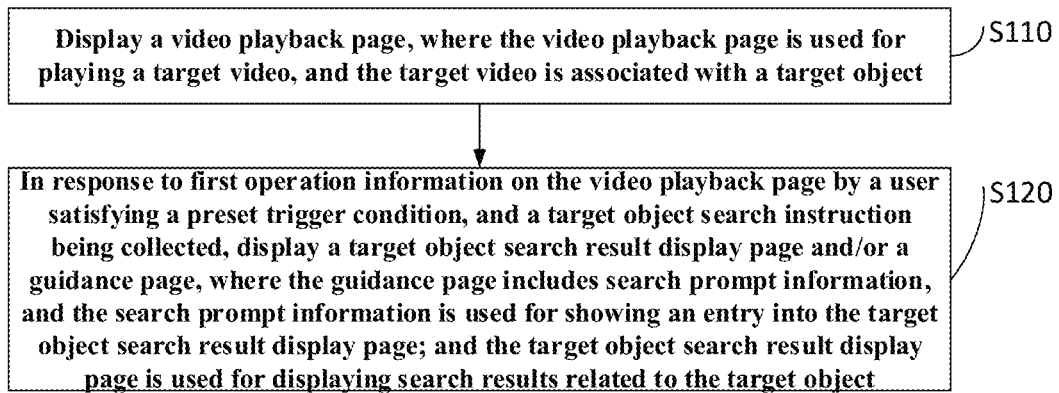
FIG. 1 is a flowchart of an interaction method according to an embodiment of the disclosure.

FIG. 1 is a flowchart of an interaction method according to an embodiment of the disclosure. This embodiment is applicable to a situation where a user interacts with an application client. The method may be performed by an interaction apparatus. The apparatus may be implemented in a method of software and/or hardware. The apparatus may be configured in an electronic device, such as a terminal specifically including but not limited to a smartphone, a palmtop, a tablet, a wearable device with a display screen, a desktop, a laptop, an all-in-one computer, a smart home device, etc.

As shown in FIG. 1, the method specifically may include:

S110: a video playback page is displayed, and is used for playing a target video associated with a target object.

The video playback page may be, for example, a page used for playing a video. The target video is a video played on the video playback page. This application does not limit the specific content conveyed by the target video. Exemplarily, in an e-commerce scenario, the target video played on the video playback page is a video recommending products to the user. The video playback page may be specifically a short video playback page, a mini video playback page, a live preview page, a live page, etc.

The object may be, for example, a thing displayed to the user. In some embodiments, in the e-commerce scenario, the object may be, for example, a product. Specifically, the object may include purchasable items or services, etc. The object has a plurality of attributes. The attributes of the object may be features inherent to the object due to construction, composition, etc. If the object is an item, the attributes of the object include a name, brand, category, style, size, material, function, trademark, type, price, color, packaging, etc. of the object. If the object is a service, attributes are the content, brand, category, precautions, price, etc., included in the object.

"A target video being associated with a target object" may mean, for example, that there is certain relationship between the target video and the target object, and the target object corresponding to the target video may be obtained according to the target video. In some scenarios, the association relationship may be pre-specified. Exemplarily, an anchor point for the target object to be associated with the target video is preset. The anchor point for the target object may be, for example, a quick access used for rapidly bringing the user to a detail page of the target object. The detail page of the target object may be, for example, a page used for displaying attributes of the target object. If the target object is a product, the anchor point for the target object may be a quick access used for rapidly bringing the user to a product detail page of the target object. In some other scenarios, the association relationship may be determined by parsing the target video. Exemplarily, if the target video is a video that a model walks the runway wearing a particular dress, an image of the dress worn by the model can be obtained by recognizing an image of the target video. In this case, the target object is the dress worn by the model, and the target video is associated with the dress worn by the model.

S120: a target object search result display page and/or a guidance page are/is displayed if first operation information on the video playback page by the user satisfies a preset trigger condition and a target object search instruction is collected, where the guidance page includes search prompt information, and the search prompt information is used for showing an entry into the target object search result display page; and the target object search result display page is used for displaying search results related to the target object.

The first operation information may be, for example, operation information used for reflecting that the user processes the target object or the target video in the process of watching the video playback page. Exemplarily, if the first operation information includes operation information for processing the target video, the first operation information may be specifically collection operation information, forwarding operation information, and commenting operation information for the target video, or operation information for viewing products in a showcase of a target video publisher, etc. If the first operation information includes the operation information for processing the target object, the first operation information may be specifically collection operation information, add-to-cart operation information, or submitted-order pending payment operation information for the target object. Submitted-order pending payment means that the user selects specification attributes (e.g., color, model, and type), and a purchase quantity of a product desired to be purchased, and submits the order, but does not pay for the submitted order.

The preset trigger condition is a determination condition for determining whether to display the target object search result display page and/or the guidance page. This application does not limit what specific conditions the preset trigger condition includes. Exemplarily, the preset trigger condition includes the first operation information being operation information used for reflecting preset processing on the target object or the target video. The preset processing may be, for example, pre-specified processing. Exemplarily, the pre-processing may be, for example, viewing detailed information of the target object but not placing an order, viewing a showcase page of the target video publisher but not placing an order, and searching for the target object on a mall homepage.

The target object search instruction may be, for example, an instruction used for conveying the desire of performing information searching based on the target object to the terminal.

The target object search result display page may be, for example, a page that collects and displays all search results obtained using one or more attributes of the target object as search conditions.

In an embodiment, optionally, the search results may include associated objects, and the target object search result display page is used for displaying summary information of the associated objects.

The associated objects are objects that have an association relationship with the target object. This application does not limit a specific association relationship between the associated objects and the target object. Exemplarily, if both the associated object and the target object are products, the association relationship includes, but is not limited to, at least one of the following: a matching relationship and a similarity relationship.

If the association relationship between the associated object and the target object includes the similarity relationship, optionally, the associated object is an object having a similarity with the target object greater than a set similarity threshold. Exemplarily, the associated objects include objects of the same style and/or similar style as the target object. In the e-commerce scenario, if the association relationship includes the similarity relationship, the target object search result display page is used for displaying products of the same style and/or similar style as the target object.

The summary information of the associated objects may be a set composed of partial attribute information of the associated objects. The summary information of the associated objects is used for briefly displaying an overview of the associated objects to the user in a text and/or image form. Optionally, the user may select the summary information of one associated object to enter an object detail page corresponding to the selected associated object. The object detail page is used for displaying all attribute information of the corresponding associated object in detail. For the same associated object, the amount of attribute information displayed on the object detail page is greater than the amount of attribute information displayed in the summary information. In the e-commerce scenario, the summary information of the associated object may be understood as a product card of the associated product.

The guidance page may be, for example, a page used for attracting user visits and performing information inquiry. In the e-commerce scenario, the guidance page may be a page used for guiding the user to view and purchase products sold on an e-commerce platform. Exemplarily, the guidance page includes a mall homepage, a search keyword input page, or an image search page. If the guidance page is the image search page, after an image is received through the image search page, the received image is recognized, and object searching is performed based on an image recognition result.

The statement of "the search prompt information is used for showing an entry into the target object search result display page" at least includes at least one of the following meanings: Meaning 1: the search prompt information may serve as an entry into the target object search result display page; and after the user selects the search prompt information, the target object search result display page can be displayed. Meaning 2: there is an option (e.g., a control) set on the guidance page to enter the target object search result display page; and the search prompt information is used for indicating a position of the option on the guidance page to enter the target object search result display page so as to guide the user to select this option.

There are multiple specific implementation methods for this step, which are not limited in this application. Optionally, the preset trigger condition includes a first preset trigger condition and a second preset trigger condition. The implementation method for this step includes: displaying a target object search result display page if first operation information on a video playback page by the user satisfies the first preset trigger condition and a target object search instruction is collected; and displaying a guidance page if the first operation information on the video playback page by the user satisfies the second preset trigger condition and a target object search instruction is collected.

The first preset trigger condition is a determination condition used for determining whether to display the target object search result display page. Optionally, the first preset trigger condition includes the first operation information being operation information used for reflecting a demand situation for the target object. The statement of "a demand situation for the target object" may be, for example, a situation where the user hopes to have the target object. Optionally, in the e-commerce scenario, the statement of "a demand situation for the target object" includes a situation where the user hopes to purchase the target object.

Exemplarily, the first preset trigger condition includes at least one of the following: the first operation information is operation information reflecting that the user views detailed information of the target object but does not place an order, the first operation information is operation information reflecting that the user views the showcase page of the target video publisher but does not place an order, the first operation information is operation information reflecting that the user searches for the target object on the mall homepage but does not place an order, the first operation information is operation information reflecting that the user adds the target object to the shopping cart but does not place an order, the first operation information is operation information reflecting that the user adds a product on the showcase page of the target video publisher to the shopping cart but does not place an order, and the first operation information is operation information reflecting that the user publishes information indicating a request to purchase the target object in a method of a personal work or a comment.

The second preset trigger condition is a determination condition used for determining whether to display the guidance page. Optionally, the second preset trigger condition includes the first operation information being operation information used for reflecting marking the target object or the target video. Optionally, the second preset trigger condition includes at least one of the following: the first operation information is operation information reflecting of favoriting and following the target object by the user, the first operation information is operation information reflecting favoriting, following, liking, and forwarding the target object by the user, and the first operation information is operation information reflecting that the user follows an account of the target video publisher.

In the above technical solution, the video playback page is displayed, and is used for playing the target video, and the target video is associated with the target object. The target object search result display page and/or the guidance page are/is displayed if the first operation information on the video playback page by the user satisfies the preset trigger condition and the target object search instruction is collected, where the guidance page includes the search prompt information, and the search prompt information is used for showing the entry into the target object search result display page; and the target object search result display page is used for displaying the search results related to the target object, which is essentially to provide a method for assisting the user in quickly finding search results related to the target object according to needs of the user. In the process of performing the whole method, there are few steps requiring user operation, thereby achieving the purpose of improving search efficiency of the user and enhancing user experience.

Based on the above technical solution, in an embodiment, optionally, before collecting a target object search instruction, the method optionally further includes: displaying a first target option on the video playback page if the first operation information on the video playback page by the user satisfies the preset trigger condition; and generating the target object search instruction in response to the first target option.

The first target option may be seen as an entry displayed on the video playback page to the target object search result display page and/or the guidance page.

Figure 2:
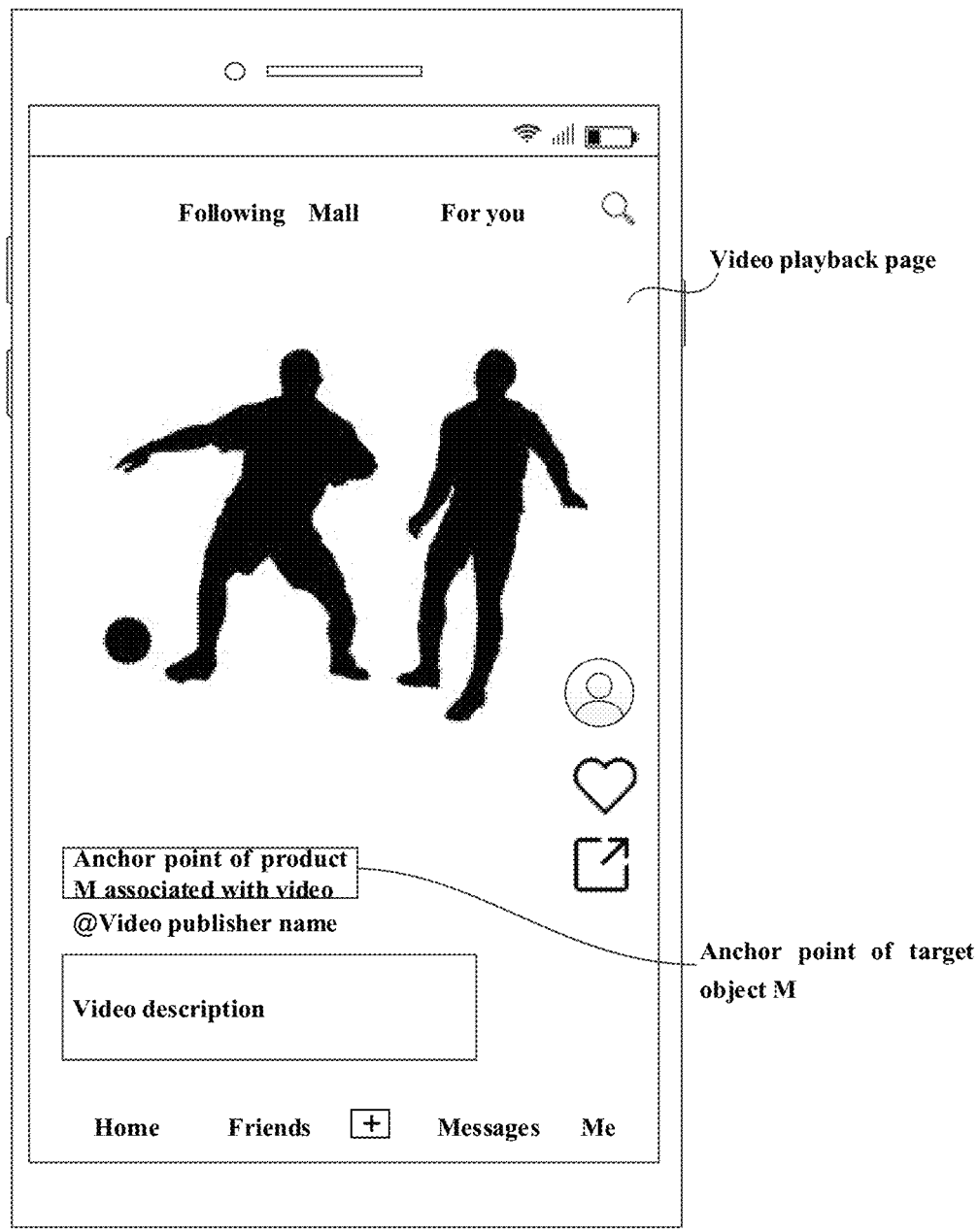
FIG. 2 and FIG. 3 are schematic diagrams of two video playback pages according to this application.
Figure 3:
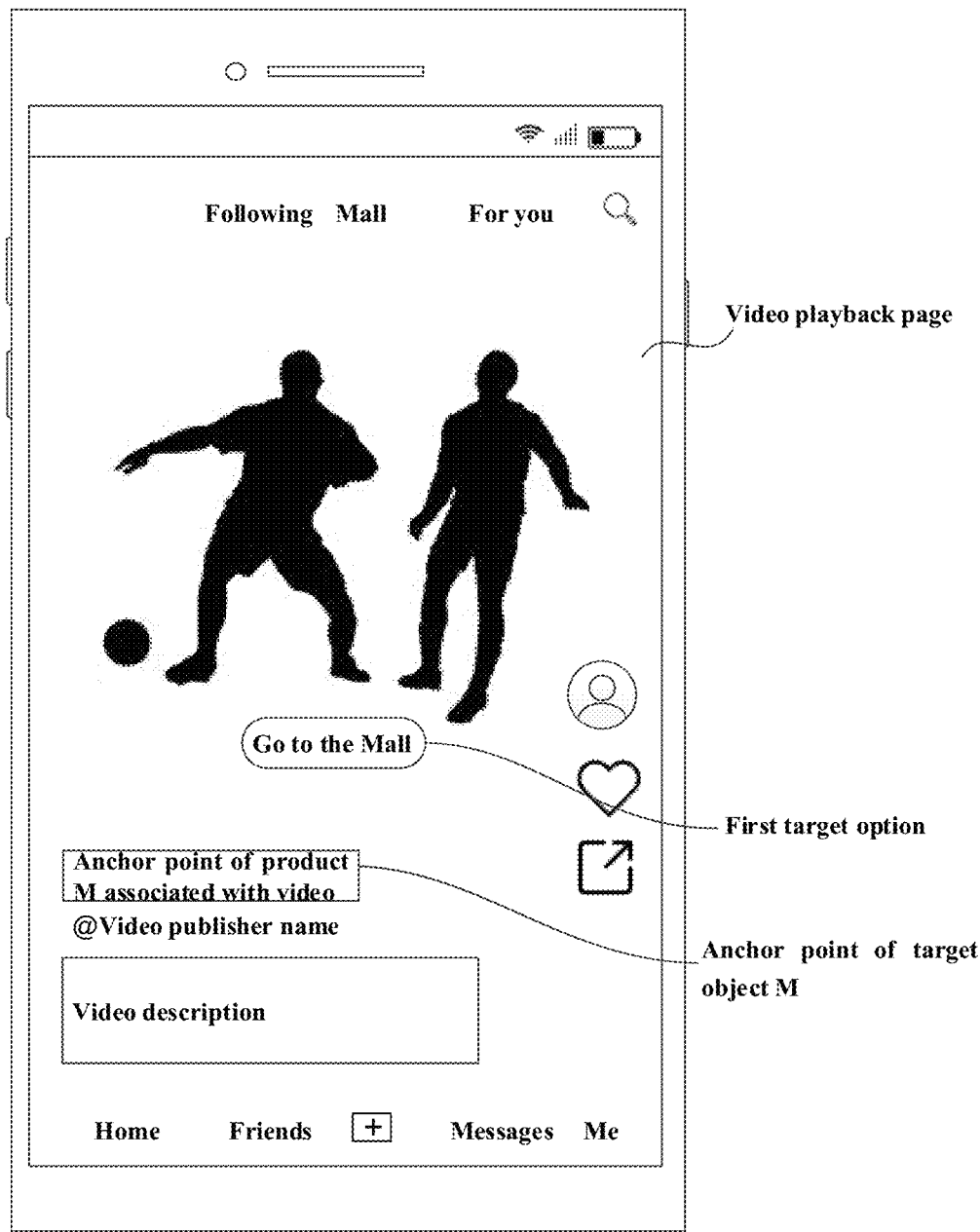

FIG. 2 and FIG. 3 are schematic diagrams of two video playback pages according to this application. Exemplarily, referring to FIG. 2, the video playback page is playing the target video, and the target video is associated with an anchor point of a target object M. After the user taps on the anchor point of the target object M, a product detail page of the target object M appears. After viewing the product detail page of the target object M, the user controls an application to return to the video playback page. The video playback page is still playing the target video, and in this case, the first operation information on the video playback page by the user (viewing detailed information of the target object but not placing an order) satisfies the preset trigger condition. Referring to FIG. 3, the option "Go to the Mall" is displayed on the video playback page. The "Go to the Mall" is a first target option. After the user selects (e.g., taps on) the "Go to the Mall" option, a target object search command is generated.

The essence of this setup is that the first target option is not always displayed on the video playback page, and the first target option can be displayed only when the first operation information on the video playback page by the user satisfies the preset trigger condition. The state that the first target option is not displayed on the video playback page is defined as a hidden state of the first target option, and the state that the first target option is displayed on the video playback page is defined as a displayed state of the first target option. By switching the first target option from the hidden state to the displayed state, the user can quickly understand an operation method for searching based on the target object, thereby reducing the leaning cost for the user.

Based on the above technical solution, in another embodiment, optionally, before collecting a target object search instruction, the method optionally further includes: detecting a second operation for the target video playback page if the first operation information on the video playback page by the user satisfies the preset trigger condition, and generating the target object search instruction if the detected second operation is a preset page switching operation.

Both the first operation and the second operation may be operations on the video playback page, a moment satisfying the preset trigger condition is taken as a reference moment, and the first operation is an operation of the user for the video playback page before the reference moment. The second operation is an operation of the user for the video playback page after the reference moment.

The preset page switching operation is pre-specified and used for determining when to generate the target object search instruction. This application does not limit the specific content of the preset page switching operation. Exemplarily, the preset page switching operation is a swipe operation in a specified direction on the video playback page, or an operation of tapping on a specified option on the video playback page.

Exemplarily, the preset page switching operation is a swipe operation to the left on the video playback page, or an operation of tapping on the "Mall" option on the video playback page. Continue to refer to FIG. 2, the video playback page is playing the target video, and the target video is associated with the anchor point of the target object M. After the user taps on the anchor point of the target object M, the product detail page of the target object M appears. After viewing the product detail page of the target object M, the user controls to an application to return to the video playback page. The video playback page is still playing the target video. In this case, the first operation information on the video playback page by the user (viewing the detailed information of the target object but not placing an order) satisfies the preset trigger condition. Then, the operation (i.e., the second operation) of the user on the video playback page continues to be monitored. If the second operation monitored at a certain moment is the swipe operation to the left on the video playback page, a target object search instruction is generated at this moment. Alternatively, if the second operation monitored at another moment is the operation of tapping on the "Mall" option on the video playback page, a target object search instruction is generated at this moment.

In the above technical solutions, in S120, the target object search result display page and/or the guidance page may be displayed. Cases of displaying the target object search result display page or the guidance page are respectively further described below.

Case 1: The target object search result display page is displayed if the second operation information of the user on the video playback page satisfies the preset trigger condition and the target object search instruction is collected.

Exemplarily, if the target object search result display page includes a target object identification information display area and a search result display area, the target object identification information display area is used for displaying target object identification information, the state of the target object identification information includes a selected state and an unselected state, the search result display area is used for displaying a search result, and the search result displayed in the search result display area is associated with the target object indicated by the target object identification information in the selected state.

The target object identification information may be, for example, information that can distinguish one target object from another target object. Exemplarily, the target object identification information includes an image, or name, etc. of a target object.

Figure 4:
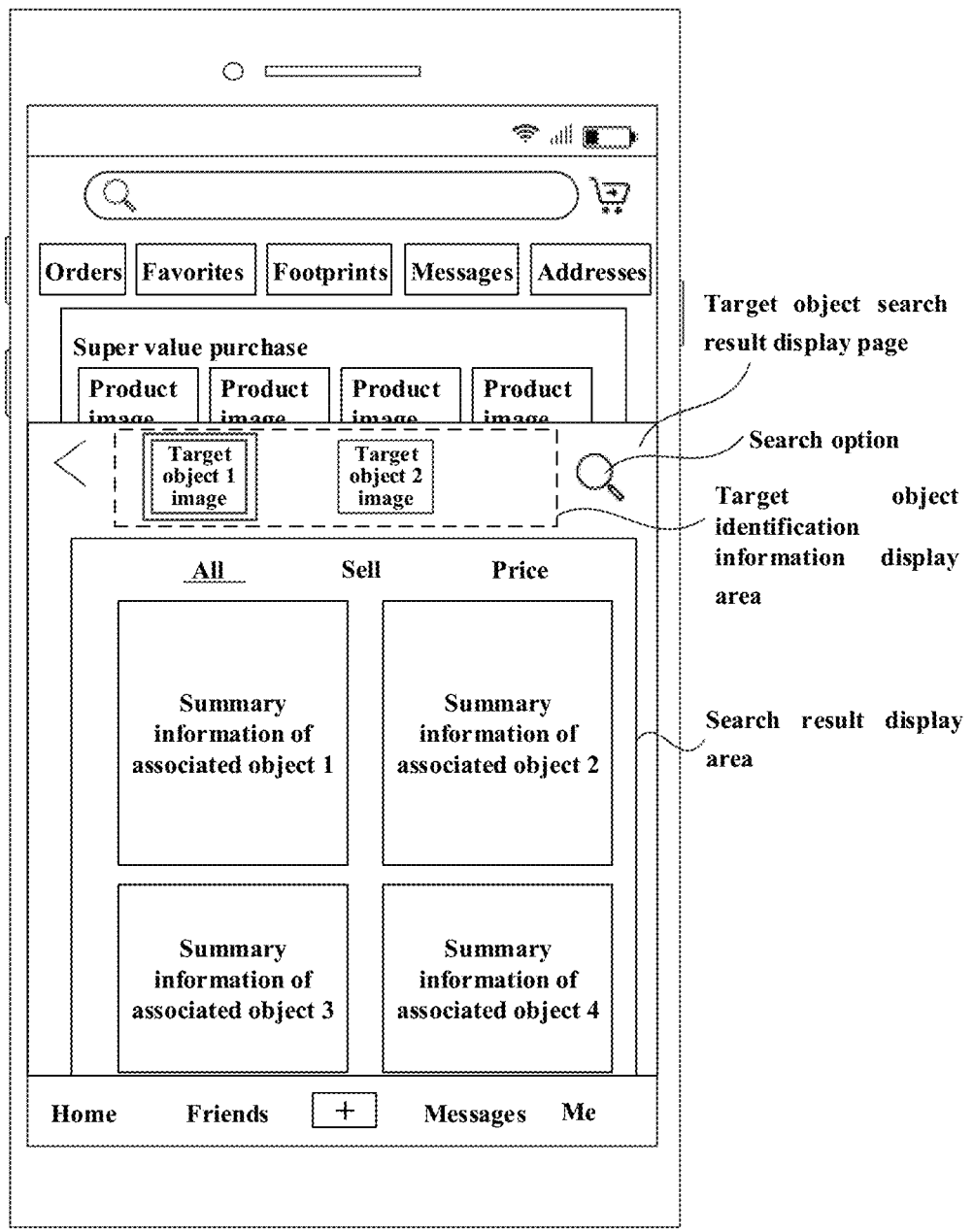
FIG. 4 and FIG. 5 are schematic diagrams of two application client interfaces according to embodiments of this application.
Figure 5:
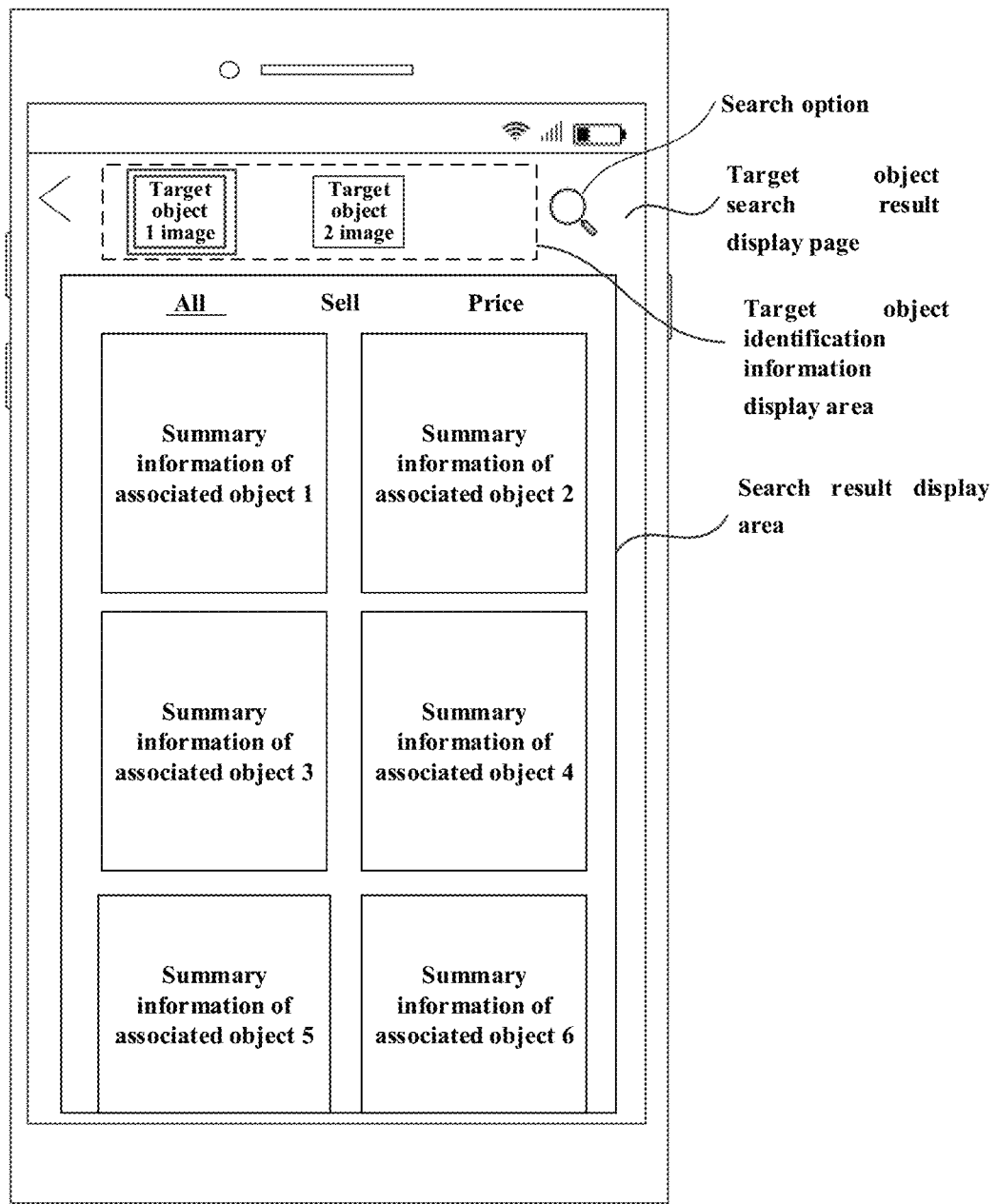

FIG. 4 and FIG. 5 are schematic diagrams of two application client interfaces according to embodiments of this application. Both FIG. 4 and FIG. 5 show a target object search result display page. The difference only lies in that in FIG. 4, the target object search result display page is presented in a half-screen display manner. In FIG. 5, the target object search result display page is presented in a full-screen display manner.

The target video is associated with a target object 1 and a target object 2. An image of the target object 1 (i.e., identification information of the target object 1) and an image of the target object 2 (i.e., identification information of the target object 2) are displayed in the target object identification information display area. Referring to FIG. 4 or FIG. 5, the image of the target object 1 is in the selected state, and a search result displayed in the search result display area is associated with the target object 1. For example, summary information of associated objects associated with the target object 1 is displayed in the search result display area. That is, an associated object 1, an associated object 2, an associated object 3, and an associated object 4 in FIG. 4 are all associated with the target object 1. An associated object 1, an associated object 2, an associated object 3, an associated object 4, an associated object 5, and an associated object 6 in FIG. 5 are all associated with the target object 1. Exemplarily, if the target object 1 is a product, summary information of products of the same or similar style as the target object 1 is displayed in the search result display area.

If the user taps on the image of the target object 2 in the target object identification information display area, the image of the target object 2 is switched from the unselected state to the selected state, the image of the target object 1 is switched from the selected state to the unselected state, and research results associated with the target object 2 are displayed in the search result display area.

Further, the target object search result display page may also be set to further include a search option. The method further includes: displaying a search keyword input page in response to a selection operation for the search option. The search keyword input page includes search recommended words, and the search recommended words are associated with the target object.

The search option may be, for example, an entry into the search keyword input page.

The search keyword input page may be, for example, a page used for receiving search keywords to be used for the current search. Exemplarily, the search keyword input page may be a mall homepage, or a search word collection display page. The search word collection display page is used for displaying a plurality of search words. Exemplarily, the search words displayed on the search word collection display page may include search recommended words, search keywords used in historical search records, highly popular search keywords, etc.

The search recommended words may be, for example, phrases automatically generated and displayed on the search keyword input page. After selecting the search recommended word, the user takes the search recommended word as the search keyword for the current search to perform searching.

The statement of "the search recommended words are associated with the target object" may, for example, mean that the search recommended word is a phrase obtained by parsing the target object, and the phrase may be a phrase for describing or summarizing one or more attributes of the target object. Exemplarily, one target object is a black woolen coat. The search recommended word is a woolen coat.

Figure 6:
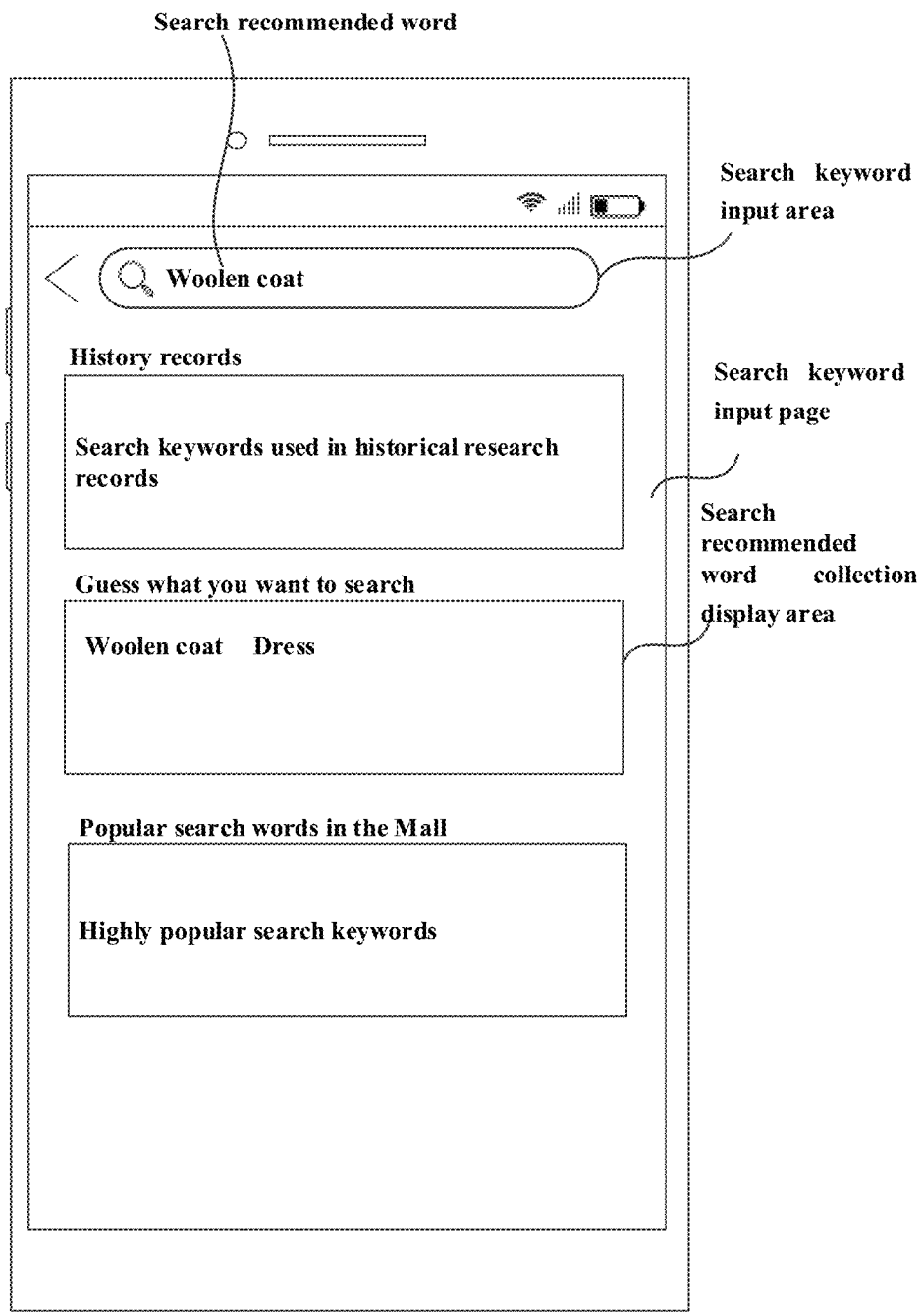
FIG. 6 is a schematic diagram of a search keyword input page according to an embodiment of this application.

FIG. 6 is a schematic diagram of a search keyword input page according to an embodiment of the disclosure. Referring to FIG. 4 or FIG. 5, the target object search result display page shows a search option. The search option is located at an upper right corner of the target object search result display page. After the user performs a selection operation on the search option (e.g., a tapping operation or a swipe operation), referring to FIG. 6, the search keyword input page is displayed. The search keyword input page is specifically a search term collection display page. The search keyword input page includes a search keyword input area, where the display position of the search recommended word "woolen coat" is located within the search keyword input area.

Optionally, the search keyword input page may also be set to include a search recommended word collection display area. The search recommended word collection display area does not overlap with the search keyword input area. The display position of the search recommended word is located within the search recommended word collection display area.

Exemplarily, continue to refer to FIG. 6, and the search keyword input page includes a section of "Guess what you want to search". The section of "Guess what you want to search" is the search recommended word collection display area, and the display position of the search recommended word "woolen coat" is located within the section of "Guess what you want to search".

Optionally, if the user selects a search recommended word or enters a search keyword on the search keyword input page, a comprehensive search result display page is shown. The comprehensive search result display page may be, for example, a page that displays comprehensive search results. The comprehensive search results are search results from a plurality of fields (e.g., a video, audio, a live streaming room, encyclopedia, and a product) that match the selected search recommended word or the search keyword entered by the user.

Figure 7:
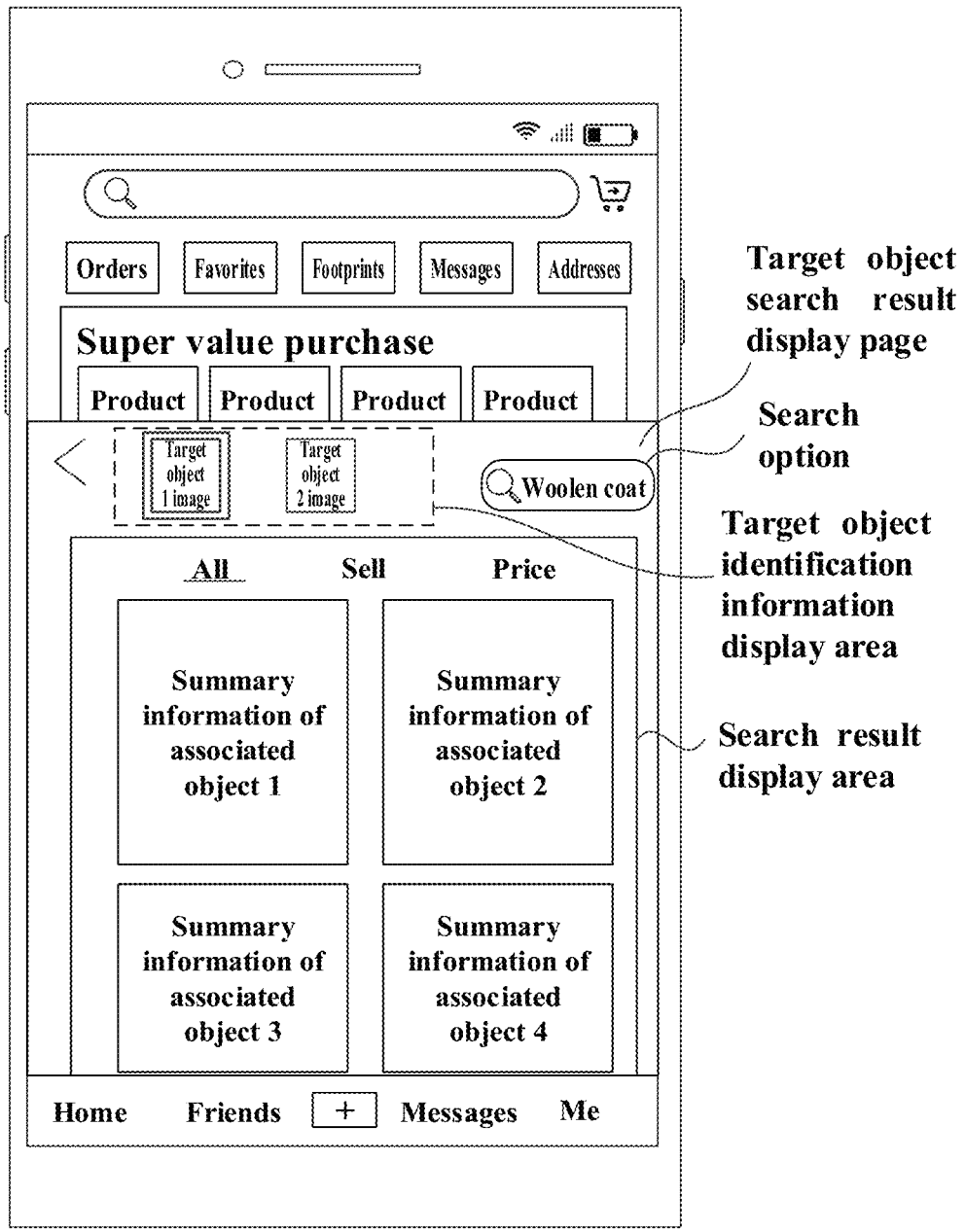
FIG. 7 and FIG. 8 are schematic diagrams of another two application client interfaces according to embodiments of this application.
Figure 8:
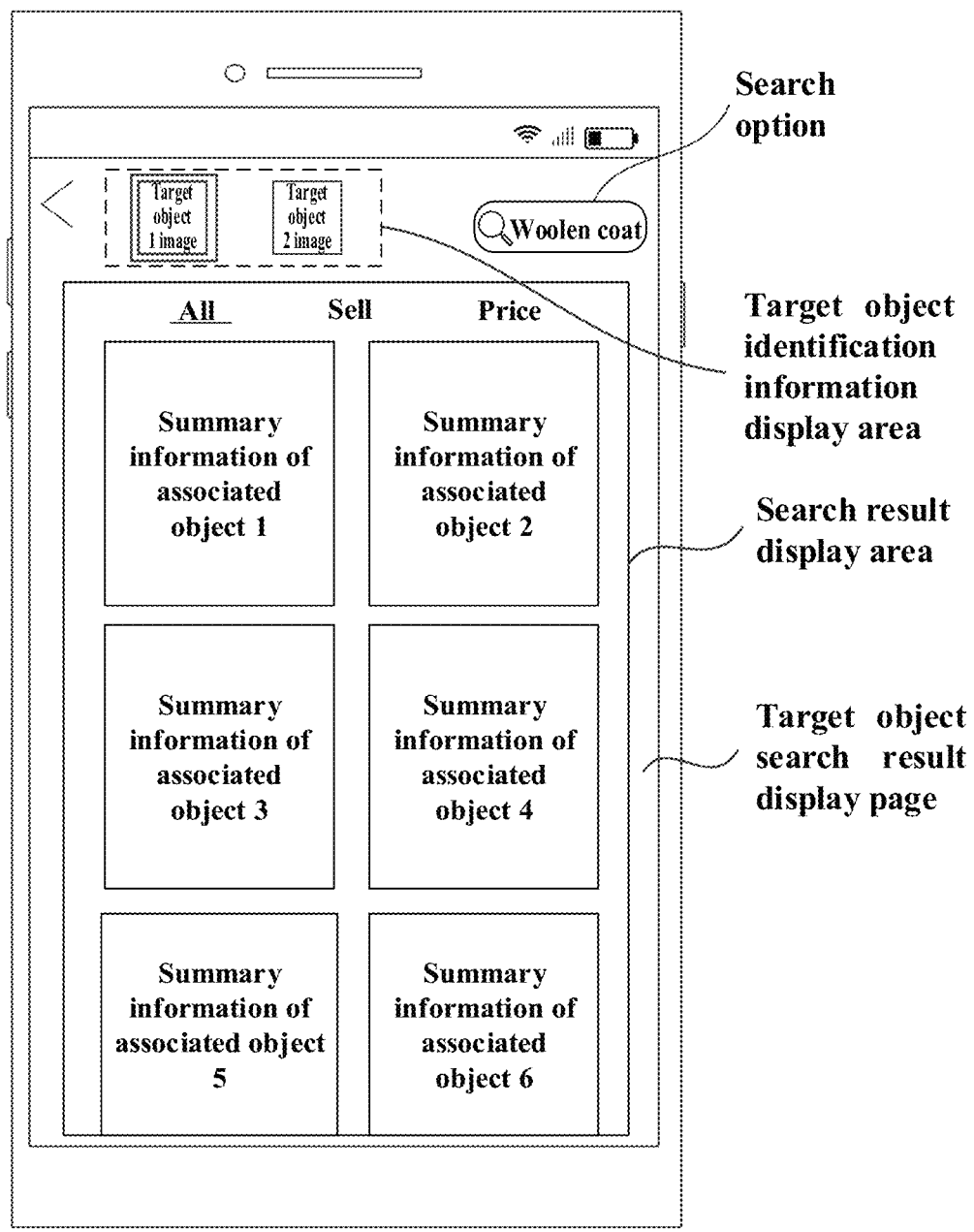

Optionally, the search option on the target object search result display page includes text information. The text information includes search recommended words associated with the target object. Exemplarily, FIG. 7 and FIG. 8 are schematic diagrams of another two application client interfaces according to embodiments of this application. In FIG. 7 and FIG. 8, the search option includes the search recommended word "woolen coat".

Based on the above technical solutions, optionally, the step of displaying a target object search result display page includes: displaying a guidance page; and displaying the target object search result display page on the guidance page.

During a specific implementation, optionally, the target object search result display page is displayed in a method of a small window or a semi-screen display, such that the target object search result display page is overlapped with the guidance page without completely obscuring the guidance page. Therefore, the user can view the guidance page when browsing the target object search result display page.

Case 2: The guidance page is displayed if the first operation information on the video playback page by the user satisfies the second preset trigger condition and the target object search instruction is collected.

Exemplarily, the guidance page further includes a page option display area and a recommended object display area. The page option display area is used for displaying at least one page option, where the at least one page option includes a second target option. The second target option serves as an entry into the target object search result display page. The page option display area includes at least one sub-display area, and each sub-display area corresponds to one page option. The recommended object display area is used for displaying summary information of a recommended object. The display position of the search prompt information is located within the sub-display area corresponding to the second target option or within the recommended object display area.

The page option may be, for example, an entry into another page in addition to the guidance page. The second target option is an entry into the target object search result display page. The recommended object is an object displayed on the guidance page. In an embodiment, recommended objects may include a target object, associated objects having an association relationship with the target object, and objects not having an association relationship with the target object.

Figure 9:
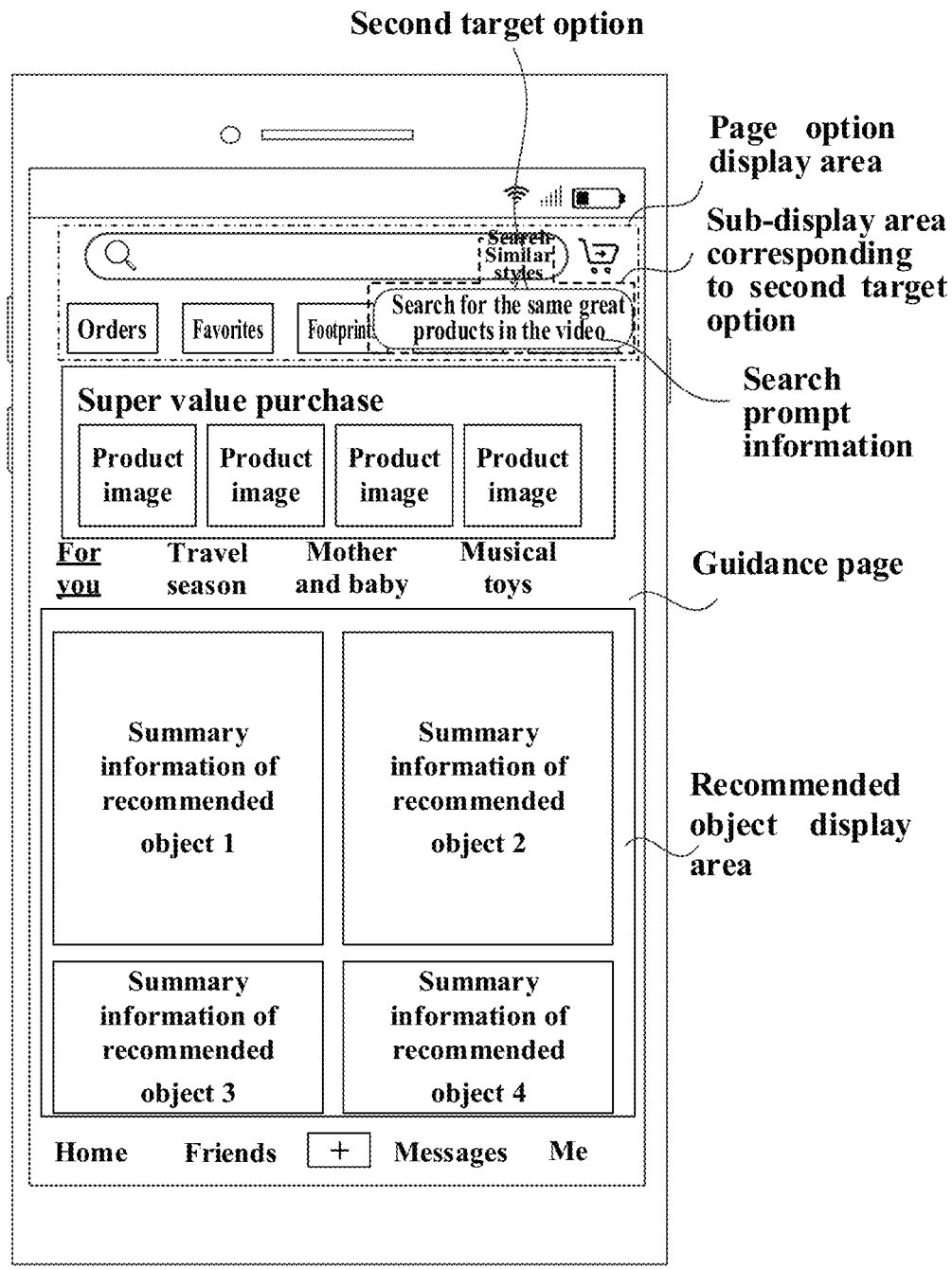
FIG. 9 and FIG. 10 are schematic diagrams of two guidance pages according to embodiments of this application.
Figure 10:
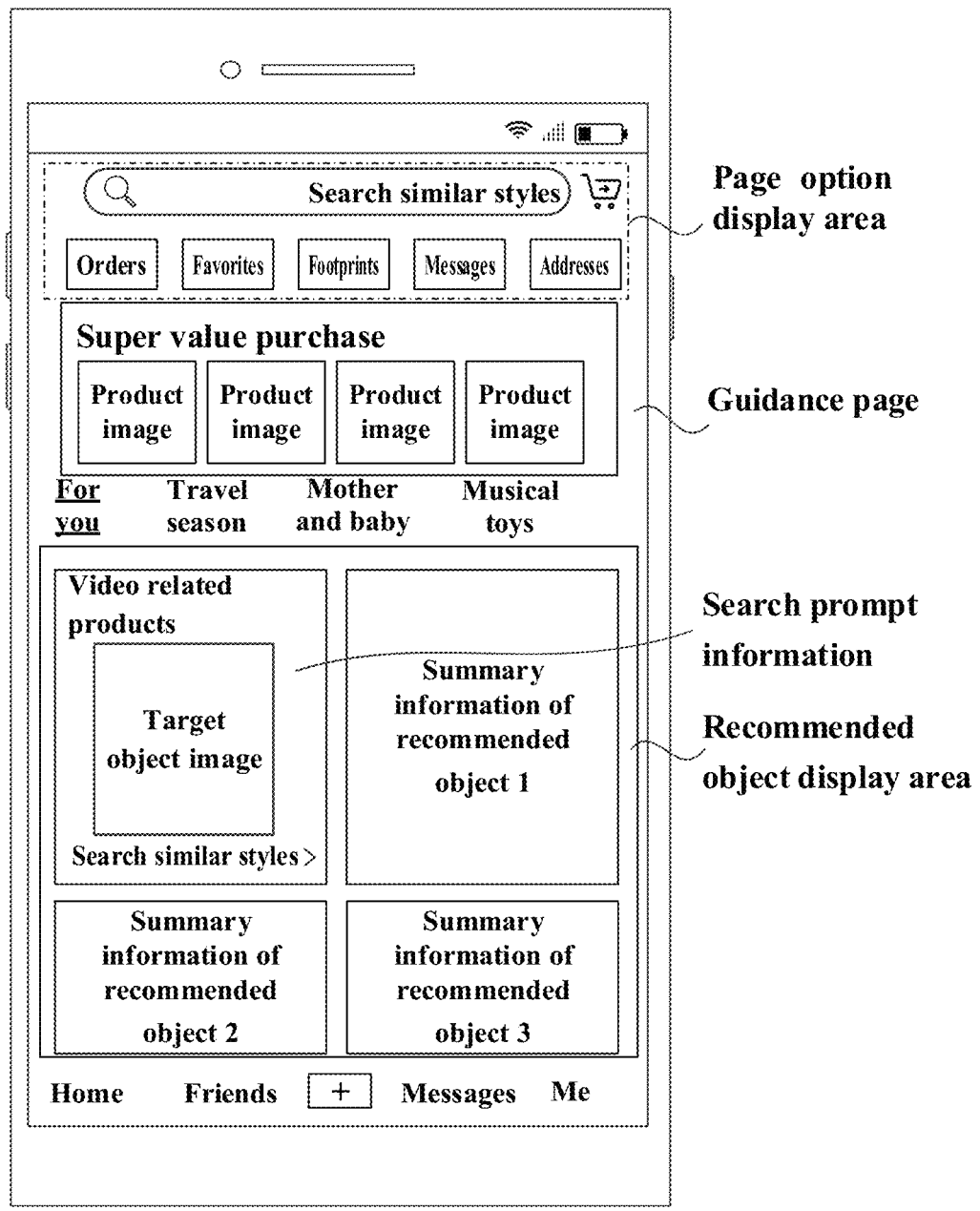

FIG. 9 and FIG. 10 are schematic diagrams of two guidance pages according to embodiments of this application. Referring to FIG. 9 and FIG. 10, the guidance page includes a page option display area and a recommended object display area. The page option display area includes a "Search similar styles" page option, an "Orders" page option, a "Favorites" page option, a "Footprints" page option, a "Messages" page option, an "Addresses" page option, a "Shopping cart" page option, among others. The "Search similar styles" page option is the second target option. The recommended object display area is used for displaying summary information of a plurality of recommended objects. In FIG. 9, the display position of the search prompt information is located in the sub-display area corresponding to the "Search similar styles" page option (i.e., the second target option). In FIG. 10, the display position of the search prompt information is located within the recommended object display area.

Based on the above technical solutions, optionally, after displaying a guidance page, the method further includes: displaying a target object search result display page in response to a selection operation for the second target option or the search prompt information. Exemplarily, continue to refer to FIG. 9 or FIG. 10, when the user taps on the search prompt information or the "Search similar styles" page option (i.e., the second target option), the target object search result display page shown in FIG. 4, FIG. 5, FIG. 7, or FIG. 8 is displayed.

The "target object search result display page" mentioned in the "displaying a target object search result display page in response to a selection operation for the second target option or the search prompt information" may be set in the same method as the target object search result display page in Case 1, which is not repeated in this application.

Further, if the target video is associated with two or more target objects, displaying a guidance page includes: respectively determining search prompt information corresponding to each target object; displaying the guidance page; sequentially displaying each search prompt information on the guidance page; or simultaneously displaying all search prompt information on the guidance page.

When the "sequentially displaying each search prompt information on the guidance page" is specifically implemented, there may be various methods. Exemplarily, one method is to arrange the search prompt information to obtain a search prompt queue; sequentially displaying each search prompt information in the search prompt queue according to an arrangement order of the search prompt information in the search prompt queue; and displaying the first search prompt information again after the last search prompt information of the search prompt queue is displayed.

Exemplarily, totally two search prompt information are determined. In the guidance page, the first search prompt information is first displayed, and after the first search prompt information is displayed for a specified duration (e.g., 3 s or 5 s), the display of the first search prompt information is stopped, and the second search prompt information is displayed. After the second search prompt information is displayed for a specified duration (e.g., 3 s or 5 s), the display of the second search prompt information is stopped, and the first search prompt information is displayed again.

Exemplarily, another method is to sequentially display each search prompt information in the search prompt queue according to the arrangement order of the search prompt information in the search prompt queue; and stop the display of the search prompt information after the last search prompt information in the search prompt queue is displayed.

Exemplarily, assuming that totally two search prompt information are determined, in the guidance page, the first search prompt information is first displayed, and after the first search prompt information is displayed for a specified duration (e.g., 3 s or 5 s), the display of the first search prompt information is stopped, and the second search prompt information is displayed. After the second search prompt information is displayed for a specified duration (e.g., 3 s or 5 s), the search prompt information is no longer displayed.

Figure 11:
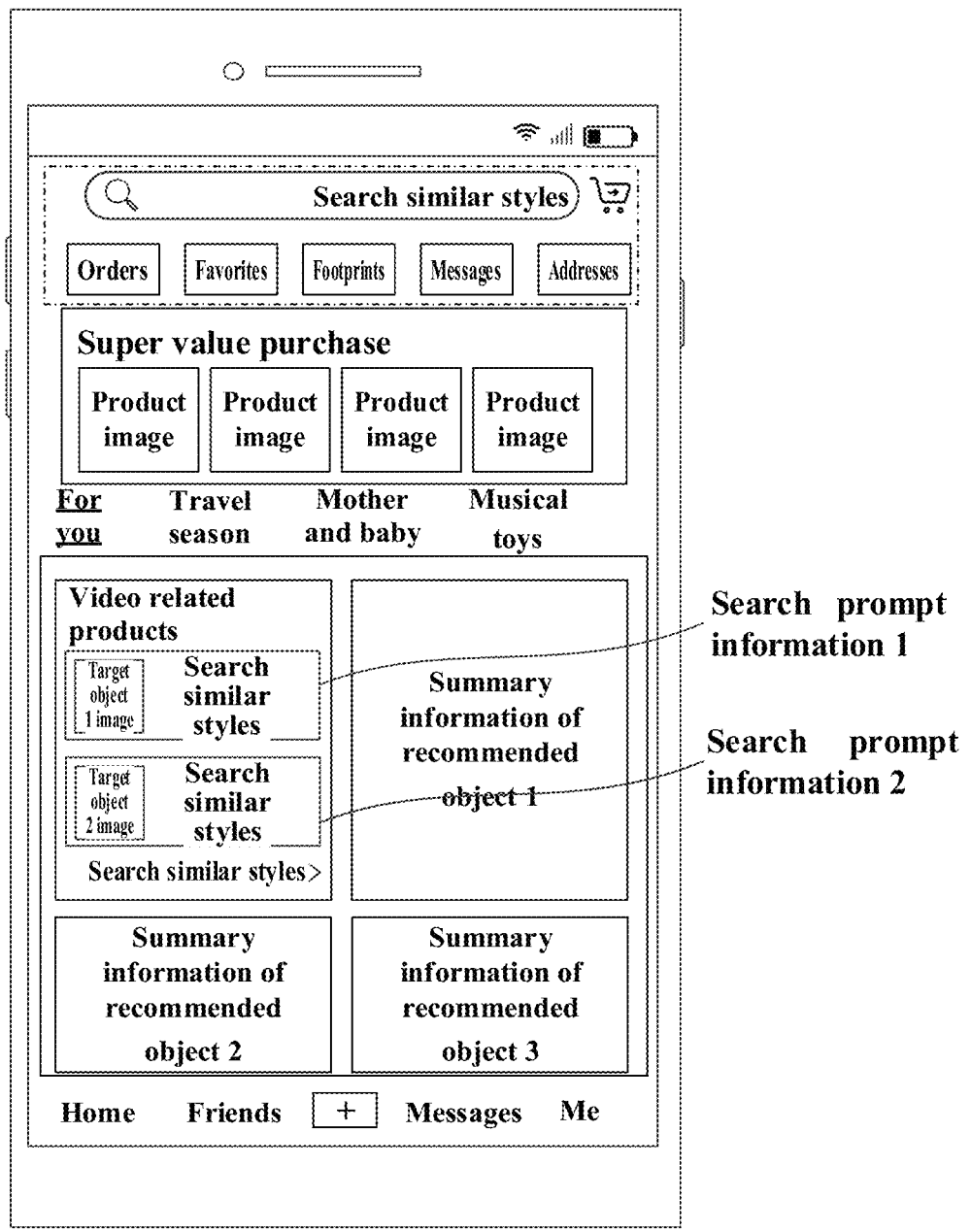
FIG. 11 is a schematic diagram of another guidance page according to an embodiment of this application.

When the "simultaneously displaying all search prompt information on the guidance page" is specifically implemented, there may be various methods, which is not limited in this application. FIG. 11 is a schematic diagram of another guidance page according to an embodiment of this application. Exemplarily, the target video is associated with a target object 1 and a target object 2. Search prompt information 1 corresponds to the target object 1, and search prompt information 2 corresponds to a target object 2. Referring to FIG. 11, the search prompt information 1 and the search prompt information 2 are simultaneously displayed on the guidance page.

Based on the above technical solutions, optionally, if the target video is associated with two or more target objects, the step of "displaying a target object search result display page if first operation information on a video playback page by the user satisfies the first preset trigger condition and a target object search instruction is collected" includes: determining a main target object from the two or more target objects if the first operation information on the video playback page by the user satisfies the first preset trigger condition and the target object search instruction is collected; and displaying the target object search result display page, where main target object identification information is in a selected state on the target object search result display page, and search results displayed in the search result display area are associated with the main target object.

The main target object may be, for example, a target object corresponding to a search result displayed by default when entering the target object search result display page. The main target object may be pre-specified, or the main target object is related to the target video or user historical operation information. If the main target object is related to the target video, exemplarily, the main target object is a target object that is displayed or introduced in the target video for the longest duration. If the main target object is determined according to the user historical operation information, exemplarily, the main target object is a target object with the highest correlation to the user historical operation information.

The user historical operation information may be, for example, information for describing a situation of a page operation on a control and/or an area in one or some pages by the user. The page operation may be, for example, a selection operation, a swipe operation, or an information input operation, etc.

Optionally, the user historical operation includes page operation information of the user on the video playback page and/or page operation information of the user on a candidate page. The candidate page refers to other pages in the same application besides the video playback page.

Exemplarily, if one application includes various pages, such as a video playback page, a graphic and text information display page, a vertical information search page, and a comprehensive information search page, the video playback page is a video playback page for a target video a, and the candidate page may be a video playback page for a target video b, the graphic and text information display page, the vertical information search page, and the comprehensive information search page in the application. The vertical information search page may be, for example, a page used for receiving search keywords entered by the user so as to search for information in a specific field (e.g., a video, audio, a live streaming room, encyclopedia, or a product). The comprehensive information search page may be, for example, a page used for receiving search keywords entered by the user so as to search for information in a plurality of fields (e.g., a video, audio, a live streaming room, encyclopedia, and a product).

Further, the user historical operation includes page operation information of the user on the video playback page within a preset time period and/or page operation information of the user on the candidate page within the preset time period. Optionally, the preset time period is used for filtering user historical operations, thereby reducing the amount of data to be processed while ensuring that the final determined main target object is up-to-date.

Optionally, the user historical operation information includes first operation information.

It should be noted that in the technical solutions of the embodiments of the disclosure, acquisition, storage, application, etc. of involved user personal information are all in compliance with relevant laws and regulations, and do not violate public order and good morals.

It should be noted that for ease of description, the foregoing method embodiments are all described as a series of action combinations. However, those skilled in the art should understand that the disclosure is not limited to the described action order, because according to the disclosure, some steps may be performed in another order or simultaneously. In addition, those skilled in the art should also understand that all the embodiments described in the specification are preferred embodiments, and the involved actions and modules are not necessary to the disclosure.

Figure 12:
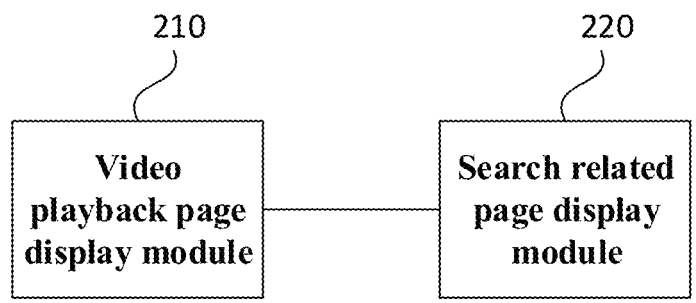
FIG. 12 is a structural schematic diagram of an interaction apparatus according to an embodiment of the disclosure.

FIG. 12 is a structural schematic diagram of an interaction apparatus according to an embodiment of the disclosure. The interaction apparatus provided by this embodiment of the disclosure may be configured into a client. Referring to FIG. 12, the interaction apparatus specifically includes:

a video playback page display module 210, configured to display a video playback page, where the video playback page is used for playing a target video, and the target video is associated with a target object; and a search related page display module 220, configured to display a target object search result display page and/or a guidance page if first operation information on the video playback page by the user satisfies a preset trigger condition and a target object search instruction is collected, where the guidance page includes search prompt information, and the search prompt information is used for showing an entry into the target object search result display page; and the target object search result display page is used for displaying search results related to the target object.

Further, the apparatus further includes an instruction generation module, configured to display a first target option on the video playback page if first operation information of the user on the video playback page satisfies a preset trigger condition before collecting a target object search instruction; generate the target object search instruction in response to a selection operation for the first target option; or, detect a second operation for the target video playback page if the first operation information on the video playback page by the user satisfies the preset trigger condition, and generate the target object search instruction if the detected second operation is a preset page switching operation.

Further, the preset trigger condition includes a first preset trigger condition and a second preset trigger condition. The first preset trigger condition includes the first operation information being operation information used for reflecting a demand situation for the target object. The second preset trigger condition includes the first operation information being operation information used for reflecting marking the target object or the target video.

The search related page display module is configured to:
display a target object search result display page if the first operation information on the video playback page by the user satisfies the first preset trigger condition and the target object search instruction is collected; and
display a guidance page if the first operation information on the video playback page by the user satisfies the second preset trigger condition and the target object search instruction is collected.

Further, if the target video is associated with two or more target objects, the search related page display module is configured to:
respectively determine search prompt information corresponding to each of the target objects;
display the guidance page; sequentially display each search prompt information on the guidance page; or simultaneously display all search prompt information on the guidance page.

Further, the guidance page further includes a page option display area and a recommended object display area.

The page option display area is used for displaying at least one page option, where the at least one page option includes a second target option. The second target option serves as an entry into the target object search result display page. The page option display area includes at least one sub-display area, and each of the sub-display areas corresponds to one of the page options.

The recommended object display area is used for displaying summary information of a recommended object.

The display position of the search prompt information is located within a sub-display area corresponding to the second target option or within the recommended object display area.

Further, the search related page display module is further configured to display the target object search result display page in response to a selection operation for the second target option or the search prompt information after displaying a guidance page.

Further, if the target object search result display page includes a target object identification information display area and a search result display area, the target object identification information display area is used for displaying target object identification information, the state of the target object identification information includes a selected state and an unselected state, the search result display area is used for displaying a search result, and the search result displayed in the search result display area is associated with a target object indicated by the target object identification information in the selected state.

Further, the target object search result display page further includes a search option. The apparatus further includes a search keyword input page display module.

The search keyword input page display module is configured to:
  display a search keyword input page in response to a selection operation for the search option. The search keyword input page includes search recommended words, and the search recommended words are associated with the target object.

Further, the search related page display module is configured to:
  display a guidance page; and
  display a target object search result display page on the guidance page.

The interaction apparatus provided by this embodiment of the disclosure may perform the steps performed by the client in the interaction method provided by the embodiments of the disclosure, and has execution steps and beneficial effects, which are not repeated herein.

Figure 13:
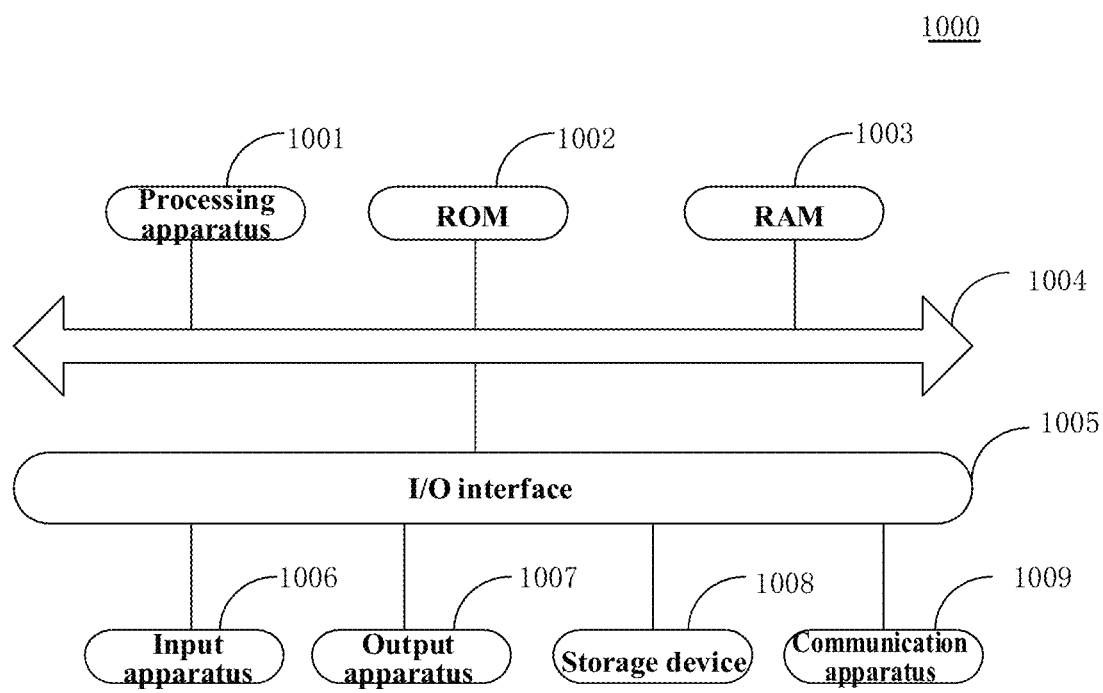
FIG. 13 is a structural schematic diagram of an electronic device according to an embodiment of the disclosure.

FIG. 13 is a structural schematic diagram of an electronic device according to an embodiment of the disclosure. Specifically referring to FIG. 13 below, FIG. 13 illustrates a structural schematic diagram of an electronic device 1000 suitable for implementing the embodiments of the disclosure. The electronic device 1000 in this embodiment of the disclosure may include, but is not limited to, mobile terminals such as a mobile phone, a notebook computer, a digital radio receiver, a personal digital assistant (PDA), a portable Android device (PAD), a portable media player (PMP), a vehicle-mounted terminal (e.g., a vehicle-mounted navigation terminal), and a wearable electronic device, as well as fixed terminals such as a digital TV, a desktop computer, and a smart home device. The electronic device shown in FIG. 13 is merely an example, which should not impose any limitations on functions and application ranges of the embodiments of the disclosure.

As shown in FIG. 13, the electronic device 1000 may include a processing apparatus (e.g., a central processing unit and a graphics processing unit) 1001, which may perform various appropriate actions and processing according to programs stored on a read-only memory (ROM) 1002 or loaded from a storage device 1008 into a random access memory (RAM) 1003, thereby implementing the interaction method according to the embodiments of the disclosure. The RAM 1003 further stores various programs and information for the operation of the electronic device 1000. The processing apparatus 1001, the ROM 1002, and the RAM 1003 are connected to one another through a bus 1004. An input/output (I/O) interface 1005 is also connected to the bus 1004.

Typically, the following apparatuses may be connected to the I/O interface 1005: an input apparatus 1006, including, for example, a touchscreen, a touchpad, a keyboard, a mouse, a camera, a microphone, an accelerometer, and a gyroscope; an output apparatus 1007, including, for example, a liquid crystal display (LCD), a speaker, and a vibrator; the storage device 1008, including, for example, a magnetic tape and a hard drive; and a communication apparatus 1009. The communication apparatus 1009 may allow the electronic device 1000 to be in wireless or wired communication with other devices for information exchange. Although FIG. 13 illustrates the electronic device 1000 with various apparatuses, it should be understood that it is not necessary to implement or have all the shown apparatuses. Alternatively, more or fewer apparatuses may be implemented or provided.

Particularly, the foregoing process described with reference to the flowchart according to the embodiments of the disclosure may be implemented as a computer software program. For example, an embodiment of the disclosure includes a computer program product including a computer program carried on a non-transitory computer-readable medium. The computer program includes program code for performing the method shown in the flowchart, thereby implementing the above interaction method. In this embodiment, the computer program may be downloaded and installed from the network by the communication apparatus 1009, or installed from the storage device 1008, or installed from the ROM 1002. The computer program, when executed by the processing apparatus 1001, performs the above functions limited in the method in the embodiments of the disclosure.

It should be noted that the computer-readable medium in the disclosure may be a computer-readable signal medium, or a computer-readable storage medium, or any combination of the above. For example, the computer-readable storage medium may include, but is not limited to: electrical, magnetic, optical, electromagnetic, infrared, or semiconductor systems, apparatuses, or devices, or any combination thereof. More specific examples of the computer-readable storage medium may include, but are not limited to: an electrical connection with one or more wires, a portable computer disk, a hard drive, a random access memory (RAM), a read-only memory (ROM), an erasable programmable read-only memory (EPROM or a flash), fiber optics, a portable compact disc read-only memory (CD-ROM), an optical storage device, a magnetic storage device, or any proper combination of the above. In the disclosure, the computer-readable storage medium may be any tangible medium including or storing a program, and the program may be used by an instruction execution system, apparatus, or device, or used in conjunction with the instruction execution system, apparatus, or device. However, in the disclosure, the computer-readable signal medium may include information signals propagated in a baseband or propagated as a part of a carrier wave, which carry computer-readable program code. The propagated information signals may have a plurality of forms, including but not limited to electromagnetic signals, optical signals, or any proper combination of the above. The computer-readable signal medium may also be any computer-readable medium other than the computer-readable storage medium. The computer-readable signal medium may send, propagate, or transmit the program used by the instruction execution system, apparatus, or device, or used in conjunction with the instruction execution system, apparatus, or device. The program code included in the computer-readable medium may be transmitted by any proper medium including but not limited to a wire, an optical cable, radio frequency (RF), etc., or any proper combination of the above.

In some implementations, the client and a server may communicate using any currently known or future-developed network protocols such as a hypertext transfer protocol (HTTP), and may also be in communication connection with digital information in any form or medium (e.g., a communication network). Examples of the communication network include a local area network ("LAN"), a wide area network ("WAN"), Internet work (e.g., Internet), a peer-to-peer network (e.g., an ad hoc peer-to-peer network), and any currently known or future-developed networks.

The computer-readable medium may be included in the above electronic device; and may separately exist without being assembled in the electronic device.

The computer-readable medium carries one or more programs. The one or more programs, when executed by the electronic device, enable the electronic device to:

display a video playback page, where the video playback page is used for playing a target video, and the target video is associated with a target object; and in response to first operation information on the video playback page by a user satisfying a preset trigger condition, and a target object search instruction being collected, display a target object search result display page and/or a guidance page, where the guidance page includes search prompt information, and the search prompt information is used for showing an entry into the target object search result display page; and the target object search result display page is used for displaying search results related to the target object.

Optionally, when the one or more programs are executed by the electronic device, the electronic device may also perform the other steps in the above embodiments.

The computer program code for executing the operations of the disclosure may be written in one or more programming languages or a combination thereof. The programming languages include, but are not limited to, object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In the case of involving the remote computer, the remote computer may be connected to the user computer via any type of network, including a local area network (LAN) or wide area network (WAN), or may be connected to an external computer (e.g., utilizing an Internet service provider for Internet connectivity).

The flowcharts and block diagrams in the accompanying drawings illustrate system architectures, functions, and operations possibly implemented by the system, method and computer program product according to the various embodiments of the disclosure. In this regard, each block in the flowcharts or block diagrams may represent a module, a program segment, or a portion of code, and the module, program segment, or portion of code includes one or more executable instructions for implementing specified logical functions. It should also be noted that in some alternative implementations, functions marked in the blocks may also occur in an order different from that marked in the accompanying drawings. For example, two consecutively-shown blocks may actually be executed in parallel basically, but sometimes may also be executed in a reverse order, which depends on involved functions. It should be further noted that each block in the block diagrams and/or flowcharts, as well as a combination of the blocks in the block diagrams and/or flowcharts may be implemented by using a dedicated hardware-based system that executes specified functions or operations, or using a combination of special hardware and computer instructions.

The units described in the embodiments of the disclosure may be implemented through software or hardware. The name of the unit does not limit the unit in certain cases.

The functions described above in this specification may be at least partially executed by one or more hardware logic components. For example, exemplary hardware logic components that can be used include, but are not limited to, a field-programmable gate array (FPGA), an application specific integrated circuit (ASIC), an application specific standard part (ASSP), a system on chip (SOC), a complex programmable logic device (CPLD), etc.

In the context of the disclosure, a machine-readable medium may be a tangible medium that may contain or store a program, and the program may be used by the instruction execution system, apparatus, or device, or used in conjunction with the instruction execution system, apparatus, or device. The machine-readable medium may be a machine-readable signal medium or a machine-readable storage medium. The machine-readable medium may include, but is not limited to: electronic, magnetic, optical, electromagnetic, infrared, or semiconductor systems, apparatuses, or devices, or any proper combination of the above. More specific examples of the machine-readable storage medium may include: an electrical connection based on one or more wires, a portable computer disk, a hard drive, a random access memory (RAM), a read-only memory (ROM), an erasable programmable read-only memory (EPROM or a flash memory), fiber optics, a portable compact disc read-only memory (CD-ROM), an optical storage device, a magnetic storage device, or any proper combination of the above content.

According to one or more embodiments of the disclosure, the disclosure provides an electronic device, including:

one or more processors; and a memory configured to store one or more programs.

When the one or more programs are executed by the one or more processors, the one or more processors implement any one of the interaction methods provided by the disclosure.

According to one or more embodiments of the disclosure, the disclosure provides a computer-readable storage medium storing a computer program. The program, when executed by a processor, implements any one of the interaction methods provided by the disclosure.

An embodiment of the disclosure further provides a computer program product. The computer program product includes a computer program or instruction. The computer program or instruction, when executed by a processor, implements the above interaction method.

It should be noted that herein, relational terms such as "first" and "second" are used only to distinguish one entity or operation from another and do not necessarily require or imply any actual relationship or order between these entities or operations. In addition, terms "comprise", "include", or any other variations thereof are intended to cover non-exclusive inclusion, and therefore a process, a method, an object, or a device including a series of elements not only includes those elements but also includes other elements not clearly listed, or further includes inherent elements for the process, the method, the object, or the device. In the absence of further restrictions, an element specified by the phrase "including a . . . " does not exclude the existence of other identical elements in the process, method, product, or, device that includes the element.

The above contents are merely specific implementations of the disclosure, such that those skilled in the art can understand or implement the disclosure. More modifications for these embodiments are apparent to those skilled in the art, and general principles defined herein may be implemented in other embodiments without departing from the spirit or scope of the disclosure. Therefore, the disclosure will not be limited by these embodiments described herein but is required to conform to a widest scope consistent with the principles and novel characteristics disclosed herein.

We claim:
1. An interaction method, comprising:
displaying a video playback page, wherein the video playback page is used for playing a video, and the video is associated with a object; and
in response to first operation information on the video playback page by a user satisfying a preset trigger condition, and a object search instruction being collected, displaying a object search result display page and/or a guidance page, wherein the preset trigger condition comprises a first preset trigger condition and a second preset trigger condition, the first preset trigger condition comprises the first operation information being operation information used for reflecting a demand situation for the object; the second preset trigger condition comprises the first operation information being operation information used for reflecting marking the object or the video; and, in response to first operation information on the video playback page by the user satisfying the preset trigger condition and the object search instruction being collected, displaying the object search result display page and/or the guidance page, comprises:
in response to the first operation information on the video playback page by the user satisfying a first preset trigger condition and the object search instruction being collected, displaying the object search result display page; and
in response to the first operation information on the video playback page by the user satisfying a second preset trigger condition and the object search instruction being collected, displaying the guidance page;
wherein the guidance page comprises search prompt information, and the search prompt information is used for showing an entry into the object search result display page; and the object search result display page is used for displaying search results related to the object, and wherein the guidance page further comprises a page option display area and a recommended object display area;
the page option display area is used for displaying at least one page option, wherein the at least one page option comprises a second option, and the second option serves as an entry into the object search result display page; and
the recommended object display area is used for displaying summary information of a recommended object.

2. The method according to claim 1, wherein the method further comprises, prior to collecting the object search instruction:
in response to the first operation information on the video playback page by the user satisfying the preset trigger condition, displaying a first target option on the video playback page; and generating the object search instruction in response to a selection operation on the first target option, or
in response to the first operation information on the video playback page by the user satisfying the preset trigger condition, detecting a second operation on the video playback page, and generating the object search instruction in response to the detected second operation being a preset page switching operation.

3. The method according to claim 1, wherein displaying a guidance page comprises, in response to the video being associated with two or more objects:
respectively determining search prompt information corresponding to each of the two or more objects;
displaying the guidance page; sequentially displaying each of the search prompt information on the guidance page; or simultaneously displaying all of the search prompt information on the guidance page.

4. The method according to claim 1, wherein
the page option display area comprises at least one sub-display area, and one of the sub-display areas corresponds to one of the page options; and
a display position of the search prompt information is located within a sub-display area corresponding to the second option or within the recommended object display area.

5. The method according to claim 1, wherein the method further comprises, after the displaying the guidance page:
displaying the object search result display page in response to a selection operation for the second option or the search prompt information.

6. The method according to claim 1, wherein,
in response to the object search result display page comprising a object identification information display area and a search result display area; the object identification information display area is used for displaying object identification information; a state of the object identification information comprises a selected state and an unselected state, the search result display area is used for displaying a search result; the search result displayed in the search result display area is associated with a object indicated by the object identification information in the selected state.

7. The method according to claim 1, wherein the object search result display page further comprises a search option; and the method further comprises:
displaying a search keyword input page in response to a selection operation for the search option, wherein the search keyword input page comprises search recommended words, and the search recommended words are associated with the object.

8. The method according to claim 1, wherein displaying the object search result display page comprises:
displaying the guidance page; and
displaying the object search result display page on the guidance page.

9. An electronic device, comprising:
one or more processors; and
a storage device configured to store one or more programs;
wherein the one or more programs, when executed by the one or more processors, cause the one or more processors to:
display a video playback page, wherein the video playback page is used for playing a video, and the video is associated with a object; and
in response to first operation information on the video playback page by a user satisfying a preset trigger condition, and a object search instruction being collected, display a object search result display page and/or a guidance page, wherein the preset trigger condition comprises a first preset trigger condition and a second preset trigger condition; the first preset trigger condition comprises the first operation information being operation information used for reflecting a demand situation for the object; the second preset trigger condition comprises the first operation information being operation information used for reflecting marking the object or the video; and, in response to first operation information on the video playback page by the user satisfying the preset trigger condition and the object search instruction being collected, the one or more programs causing the one or more processors to display the object search result display page and/or the guidance page, further cause the one or more processors to:

in response to the first operation information on the video playback page by the user satisfying a first preset trigger condition and the object search instruction being collected, display the object search result display page; and in response to the first operation information on the video playback page by the user satisfying a second preset trigger condition and the object search instruction being collected, display the guidance page;

wherein the guidance page comprises search prompt information, and the search prompt information is used for showing an entry into the object search result display page; and the object search result display page is used for displaying search results related to the object, and wherein the guidance page further comprises a page option display area and a recommended object display area;

the page option display area is used for displaying at least one page option, wherein the at least one page option comprises a second option, and the second option serves as an entry into the object search result display page; and the recommended object display area is used for displaying summary information of a recommended object.

10. The electronic device according to claim 9, wherein the one or more programs further cause the one or more processors to, prior to collecting the object search instruction:

in response to the first operation information on the video playback page by the user satisfying the preset trigger condition, display a first option on the video playback page; and generating the object search instruction in response to a selection operation on the first option; or in response to the first operation information on the video playback page by the user satisfying the preset trigger condition, detect a second operation on the video playback page, and generating the object search instruction in response to the detected second operation being a preset page switching operation.

11. The electronic device according to claim 9, wherein the one or more programs causing the one or more processors to display a guidance page further cause the one or more processors to, in response to the video being associated with two or more objects:

respectively determine search prompt information corresponding to each of the objects;

display the guidance page; sequentially displaying each of the search prompt information on the guidance page; or simultaneously displaying all of the search prompt information on the guidance page.

12. The electronic device according to claim 9, wherein the page option display area comprises at least one sub-display area, and one of the sub-display areas corresponds to one of the page options; and a display position of the search prompt information is located within a sub-display area corresponding to the second option or within the recommended object display area.

13. The electronic device according to claim 9, wherein the one or more programs further cause the one or more processors to, after the displaying the guidance page:

display the object search result display page in response to a selection operation for the second option or the search prompt information.

14. The electronic device according to claim 9, wherein, in response to the object search result display page comprising a object identification information display area and a search result display area; the object identification information display area is used for displaying object identification information; a state of the object identification information comprises a selected state and an unselected state, the search result display area is used for displaying a search result; the search result displayed in the search result display area is associated with a object indicated by the object identification information in the selected state.

15. The electronic device according to claim 9, wherein the object search result display page further comprises a search option; and the one or more programs further cause the one or more processors to:

display a search keyword input page in response to a selection operation for the search option, wherein the search keyword input page comprises search recommended words, and the search recommended words are associated with the object.

16. The electronic device according to claim 9, wherein the one or more programs causing the one or more processors to display the object search result display page further cause the one or more processors to:

display the guidance page; and display the object search result display page on the guidance page.

17. A non-transitory computer-readable storage medium having a computer program stored thereon which, when executed by a processor, causes the processor to:

display a video playback page, wherein the video playback page is used for playing a video, and the video is associated with a object; and in response to first operation information on the video playback page by a user satisfying a preset trigger condition, and a object search instruction being collected, display a object search result display page and/or a guidance page, wherein the preset trigger condition comprises a first preset trigger condition and a second preset trigger condition; the first preset trigger condition comprises the first operation information being operation information used for reflecting a demand situation for the object; the second preset trigger condition comprises the first operation information being operation information used for reflecting marking the object or the video; and, in response to first operation information on the video playback page by the user satisfying the preset trigger condition and the object search instruction being collected, the computer program causing the processor to display the object search result display page and/or the guidance page, further cause the processor to:

in response to the first operation information on the video playback page by the user satisfying a first preset trigger condition and the object search instruction being collected, display the object search result display page; and in response to the first operation information on the video playback page by the user satisfying a second preset trigger condition and the object search instruction being collected, display the guidance page;

wherein the guidance page comprises search prompt information, and the search prompt information is used for showing an entry into the object search result display page; and the object search result display page is used for displaying search results related to the object, and wherein the guidance page further comprises a page option display area and a recommended object display area;

the page option display area is used for displaying at least one page option, wherein the at least one page option comprises a second option, and the second option serves as an entry into the object search result display page; and the recommended object display area is used for displaying summary information of a recommended object.

18. The non-transitory computer-readable storage medium according to claim 17, wherein the computer program further causes the processor to, prior to collecting the object search instruction:

in response to the first operation information on the video playback page by the user satisfying the preset trigger condition, display a first option on the video playback page; and generating the object search instruction in response to a selection operation on the first option; or in response to the first operation information on the video playback page by the user satisfying the preset trigger condition, detect a second operation on the video playback page, and generating the object search instruction in response to the detected second operation being a preset page switching operation.

* * * * *